United States Patent [19]

Perelman

[11] 4,304,713
[45] Dec. 8, 1981

[54] PROCESS FOR PREPARING A FOAMED PERFLUOROCARBON DIELECTRIC COAXIAL CABLE

[75] Inventor: Robert D. Perelman, Hazel Crest, Ill.

[73] Assignee: Andrew Corporation, Orland Park, Ill.

[21] Appl. No.: 125,859

[22] Filed: Feb. 29, 1980

[51] Int. Cl.³ .............................................. B29D 27/00
[52] U.S. Cl. ..................... 264/45.9; 29/458;
29/828; 264/53; 264/174; 264/DIG. 5;
264/DIG. 13; 521/98
[58] Field of Search ................ 264/53, DIG. 13, 45.9,
264/174, DIG. 5; 521/98; 29/458, 828

[56] References Cited

U.S. PATENT DOCUMENTS

| | | |
|---|---|---|
| 3,072,583 | 1/1963 | Randa . |
| 3,575,897 | 4/1971 | Port et al. ..................... 264/53 X Y |
| 3,843,757 | 10/1974 | Ehrenfreund et al. ............... 264/53 |
| 3,962,153 | 6/1976 | Gore . |
| 4,048,208 | 9/1977 | Spicuzza et al. ........... 264/DIG. 13 |
| 4,075,265 | 2/1978 | McClung et al. .......... 264/DIG. 13 |
| 4,107,354 | 8/1978 | Wilkenloh et al. ......... 264/DIG. 13 |

OTHER PUBLICATIONS

Slothour, "Expanded PTFE Dielectrics for Coaxial Cables", Plastics Engineering, Mar. 1975, pp. 49–51.
Sales lit. of Storm Products Co., entitled "Microporous Teflon Coax".
TR. No. 94 of E. I. duPont de Nemours & Co. (Inc.) Feb. 21, 1962 "Teflon 100 FEP–Fluorocarbon Resins, Method of Producing Foamed Constructions".
TR. No. 102 of E. I. duPont de Nemours and Co. (Inc.) "Method of Extruding Foamed Shapes of 'Teflon' 100, FEP–Fluorocarbon Resin" (undated).

Primary Examiner—Philip Anderson
Attorney, Agent, or Firm—Leydig, Voit, Osann, Mayer & Holt, Ltd.

[57] ABSTRACT

An improved foamable dielectric composition comprising a melt extrudable perfluorocarbon resin containing therein (i) a polytetrafluoroethylene (PTFE) nucleating agent and (ii) a volatile blowing agent, preferably a lower fluorocarbon blowing agent having only one or two carbon atoms; a process for forming such a composition; and, products produced therewith. More specifically, a foamed melt extrudable fluorinated ethylene-propylene (FEP) polymer containing therein a PTFE nucleating agent and blown to a foamed structure by means of a volatile fluid—e.g., a lower fluorocarbon such as fluoromethane or, preferably, fluoroethane, a process for forming such a foamed compostion; and, products produced therewith such as jacketed electrical conductors and/or coaxial cables wherein at least one conductor is bonded to such a foamed melt extrudable resin. The foamed dielectric melt extrudable resin is characterized by its thermal stability, fire resistance, small closed cell structure, low density, and low insulating loss characteristics. In a preferred embodiment, the melt extrudable foamed resin comprises a perfluorocarbon polymer having a closed cellular structure with cells ranging from 10 to 40 mils., a density at least as low as 1.0 g./cc., and an insulation loss of less than 1.8 db/100 ft. at 1000 MHz.

8 Claims, 5 Drawing Figures

PROCESS FOR PREPARING A FOAMED PERFLUOROCARBON DIELECTRIC COAXIAL CABLE

BACKGROUND OF THE INVENTION

The present invention relates in general to an improved method for forming products from a foamable dielectric composition, wherein the composition comprises a melt extrudable perfluorocarbon resin containing therein a polytetrafluoroethylene (PTFE) nucleating agent for controlling the size of the cellular structure of the foam, yet which does not significantly degrade the strength of the resin and, consequently, which permits blowing the resin to a density as low as 0.50 g./cc. with a suitable volatile fluid such, for example, as a lower fluorocarbon preferably having one or two carbon atoms—i.e., a fluoromethane represented by the formula:

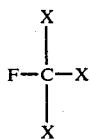

or, preferably, a fluoroethane represented by the formula:

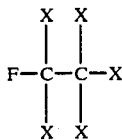

where X is selected from the group consisting of fluorine, chlorine, bromine and hydrogen. The present invention is particularly advantageous for use in the cable industry where, for example, the inventive composition and process can be used to form a foamed fluorinated ethylene-propylene (FEP) polymer—bonded to one or more conductors; and, where the foamed polymer can comprise either an insulating jacket surrounding one or more conductors and/or a dielectric material used to hold the inner and outer conductors of a coaxial cable in the desired spaced relationship.

Coaxial cables with a foam dielectric between the inner and outer conductors have been in commercial production since at least the 1950's. The dielectric loss of such cables has always been higher than that of the so-called "air dielectric" cables which use solid dielectric elements such as beads, helixes, or the like to hold the inner and outer conductors in the desired spaced relation; but, the disadvantage of higher dielectric loss of the foamed dielectric has been offset by the advantage of the foam in blocking the transmission of moisture into and through the cable, thereby eliminating the need for gas pressurization or evacuation systems to keep moisture out of the cable. Moisture, of course, greatly increases the losses in coaxial cables and may, in fact, render such cables inoperative.

Over the years since the introduction of foam dielectric cables, a number of different dielectric compositions have been used and/or proposed for use. Additionally, a number of different techniques have either been used or proposed for use: (i) to foam the dielectric resin; (ii) to apply the dielectric resin to the cable; (iii) to control the size, uniformity and structure of the cells in the foam; and (iv), to treat the foam after it has been formed. For example, a number of different dielectric materials and blowing agents or gas sources have been used or proposed for use in the manufacture of such cables. The foaming of the dielectric plastic resin has generally been effected either by the incorporation of a chemical blowing agent in the molten resin which is then thermally decomposed, or by the injection of a volatile fluid directly into the molten resin during extrusion thereof. The direct injection technique makes it more difficult to control the density and cell size of the foam, but produces a lower loss foam without the necessity of a drying step to remove moisture, which is one of the reaction products produced by some of the chemical blowing agents. The present assignee's Canadian Pat. No. 931,719 discloses a process which used a combination of both of the foregoing foaming techniques. Still another method involves swelling the resin in a suitable solvent and, thereafter, extruding the swollen resin at a temperature well above the boiling point of the solvent.

Certain of the foam jacketed and/or dielectric cables heretofore made have had the foam adhesively bonded to the conductor to more firmly "lock" the foam and conductor together and/or to insure blockage of fluid flow along the interface between the foam and the conductor. Bonding of the foam to the conductor has also been effected by heating the conductor. Other foam dielectric coaxial cables have been made without any bond between the foam and the conductors, still achieving uniform spacing between the inner and outer conductors and relatively tight engagement of the foam with the inner conductor. It is believed that any and all of the foregoing techniques may be used with compositions and processes embodying the present invention.

The melt extrudable resin used in the present invention is a perfluorocarbon resin, copolymers of tetrafluoroethylene and hexafluoropropylene. Such perfluorocarbon materials are commonly referred to as "fluorinated ethylene-propylene" (FEP) polymers. In the aforesaid Randa U.S. Pat. No. 3,072,583 it has been recognized that FEP polymers may be easily fabricated and possess excellent properties in terms of dielectric strength and high melting point, thereby making such materials particularly suitable for use as a foamed dielectric in, e.g., coaxial cables or the like.

It has, therefore, been proposed in the aforesaid Randa U.S. Pat. No. 3,072,583 that a melt extrudable FEP resin be foamed using a fluoromethane—preferably, either dichlorodifluoromethane or chlorodifluoromethane—blowing agent and boron nitride as a nucleating agent. However, I have found that the use of boron nitride as a nucleating agent imposes severe undesired constraints on both the foaming process and the characteristics of the resulting foamed product; apparently because if sufficient boron nitride is added to the FEP resin to produce a small cell structure—e.g., cells on the order of 1 to 40 mils. in diameter—the melt strength of the resinous material is significantly decreased, thereby precluding blowing the resin to densities as low as, e.g., 0.5 g./cc. Rather, with small cellular structure on the order of 1 to 40 mils., it appears that the densities normally achievable are on the order of from 0.93 g./cc. to 1.5 g./cc. Conversely, if the amount of boron nitride added to the FEP resin is reduced so as to maintain relatively high strengths for the resinous material, thereby permitting blowing of the material to low density, the cell structure is degraded and cell size becomes objectionably large. It is believed that the foregoing problem—viz., an inability to obtain both (i) uniform small sized cell structure and (ii) low density—is, at least to a degree, further compounded when using fluromethane blowing agents.

SUMMARY OF THE INVENTION

It is a general aim of the present invention to provide improved foamable compositions including melt extrudable perfluorocarbon resins and methods for preparing products incorporating such compositions, where all of the foregoing disadvantages inherent in the prior art are effectively overcome. In this connection, it is an object of the invention to provide foamable compositions incorporating a nucleating agent which is compatible with the perfluorocarbon resin and which does not, at least to any significant extent, decrease the melt strength of the resinous material; and which, therefore, permits blowing the resinous perfluorocarbon material to form a foamed cellular structure characterized by both its relatively small uniform cell size and by its relatively low density.

A principal object of the present invention is the provision of an improved foamable perfluorocarbon composition and forming therewith insulating jackets on electrical conductors as well as for forming a foam dielectric material in a coaxial cable; and, wherein the foamed composition is characterized by its stability at relatively high temperatures, e.g., 200° C., (392° F.); its fire resistance; its uniform small cell size and low density (characteristics which are particularly desirable in coaxial cables and which are also advantageous in insulating jackets for electrical conductors); and its significantly improved electrical performance in terms of reduced insulation loss and attenuation (characteristics highly important in coaxial cables).

A related, but more specific object of the invention, is to provide an improved method for preparing a cable in which the foamed perfluorocarbon dielectric resin has a lower density than in previously foamed perfluorocarbon dielectric compositions; yet, wherein the foamed perfluorocarbon resin has the requisite relatively small cell size, uniformity, structure, and composition to provide the necessary structural strength and moisture blocking and electrical characteristics.

A further object of the invention is to provide a process that is suitable for manufacturing foamed dielectric cables and foamed jacketed electrical conductors of the foregoing type on a commercial scale by extruding the foamable composition directly onto a conductor. Thus, a related object is to provide such a process that can be carried out efficiently and economically.

In one of its more detailed aspects, it is an object of the invention to provide a composition including a melt extrudable perfluorocarbon resin and a process for foaming such resin which permits forming such a foamed composition at considerably lower temperature ranges than heretofore possible—e.g., at process temperatures on the order of only 500 to 620° F. as contrasted with prior art processes which require temperatures in excess of 680° F.—thereby providing significant savings in terms of energy consumption. A related object is to provide such a composition and process which minimize corrosion of the processing equipment.

DESCRIPTION OF THE DRAWINGS

These and other objects and advantages of the present invention will become more readily apparent upon reading the following detailed description and upon reference to the attached drawing, in which.

Figure 1:
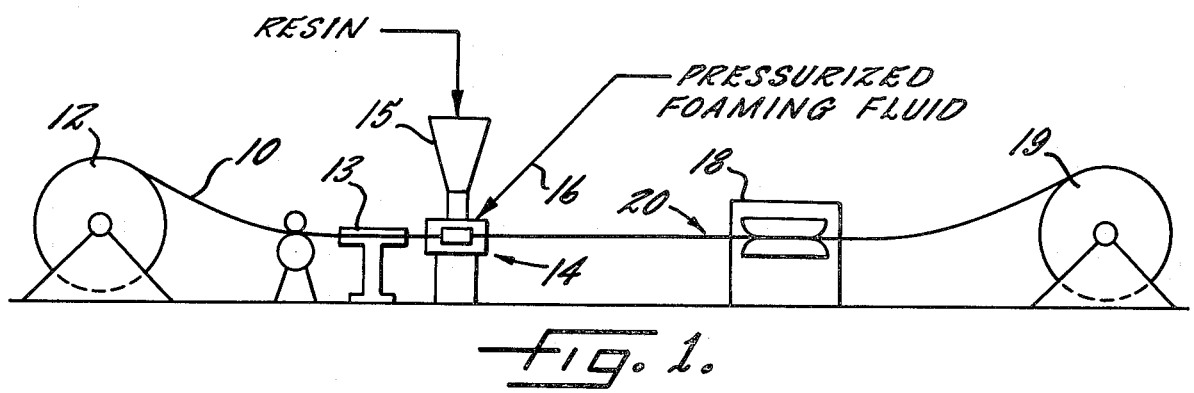
FIG. 1 is a highly diagrammatic schematic illustration of a process for producing a foamed composition suitable, for example, for use as a jacket on electrical conductors or as a foamed dielectric coaxial cable core or the like, all in accordance with the present invention.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

It has been generally known heretofore that there is a correlation between the amount of dielectric present in a given length of cable—e.g., the density of the foam dielectric—and the insulation loss and attenuation characteristics of the cable. In general, the insulation loss and attenuation decrease as the amount of dielectric decreases. However, it has also been known that the lower density foams are better thermal insulators, which tends to impede the dissipation of heat from the inner conductor of a coaxial cable and, therefore, tends to reduce the power rating of the cable. Moreover, there has been difficulty in achieving successful manufacture of a foam FEP dielectric cable with insulation loss and attenuation characteristics approaching those of the air dielectric cables. The present invention is capable of providing a foam perfluorocarbon dielectric cable with low insulation loss and attenuation characteristics which approximate those of air dielectric cables, while also providing fire resistance along with most of the advantages of previous foam dielectric cables.

Cables made in accordance with the present invention are formed by extruding a melt extrudable perflourocarbon resin directly onto an electrical conductor (which may be precoated with an adhesive material) while foaming the resin by injecting a blowing agent—e.g., a volatile fluid such as a lower fluorocarbon having only one or two carbon atoms—directly into the resin, and bonding the foamed resin to the electrical conductor to form a continuous unitary layer of foam dielectric with a uniform thickness along the entire length and around the entire circumference of the conductor. Alternatively, although not illustrated in the drawing, those skilled in the art will appreciate that the volatile fluid may be dissolved in the solid resin prior to the heating and/or extrusion process in the manner described in the aforesaid Randa U.S. Pat. No. 3,072,583. The proportions of melt extrudable perfluorocarbon resin and volatile fluid are controlled to form a closed cell foam with a density at least as low as 1.0 g./cc. and an insulation loss of less than 1.8 db/100 ft. at 1000 MHz.

A process for manufacturing a jacketed electrical conductor—which may comprise the core of a coaxial cable—according to the present invention has been schematically illustrated in FIG. 1. As there shown, an electrical conductor 10 is withdrawn from a supply reel 12 and then chemically cleaned and passed through a heater 13, after which the heated conductor is preferably coated with an adhesive. When employed, such an adhesive coating extends continuously along the entire length of the inner conductor and around the entire circumference thereof. From the heater 13, the electrical conductor 10 is passed through the crosshead of an extruder 14 where a layer of foamable dielectric melt extrudable resin from a hopper 15 is formed around the conductor. To foam the melt extrudable resin, and in the exemplary system illustrated in FIG. 1, a pressurized volatile fluid is fed into the extruder 14 through a line 16 and is mixed with the molten melt extrudable resin so that the dielectric layer formed around the conductor 10 foams after it exits from the extruder.

Within the extruder, the melt extrudable resin is heated above its melt temperature prior to injection of the volatile fluid to obtain thorough dissolution or mixing of the fluid throughout the resin. Between the point where the volatile fluid is injected into the resin and the exit die, the temperature is reduced to the desired melt temperature—i.e., the temperature at which the resin exits from the extruder—which is generally in the range of about 500° F. to about 620° F. for perfluorocarbon resins. The melt temperature should be just high enough to permit the resin to be foamed. Although not shown in detail in the drawing, it has been found that excellent results are obtained when using a co-rotating twin screw extruder and a standard wire coating crosshead equipped with conventional tubing type tip and die, and a vacuum as contrasted with pressure type cooling. Thus, such a system produces a smooth surface coating without voids along the inner conductor 10. After the foaming of the dielectric is completed, the foam is cooled so as to form a foam perfluorocarbon jacket or layer 17 having dielectric properties which can serve either as the insulating jacket for an electrical conductor 20 (FIGS. 2 and 3) or, alternatively, which can comprise the dielectric core of a coaxial cable 21 (FIGS. 4 and 5) and which is capable of supporting an outer conductor in precisely spaced relationship to the inner conductor. Such cooling may be effected by blowing air onto the foam or by means of a water spray or bath (not shown). The resulting jacketed conductor 20 is drawn through the process line by a capstan 18 and wound onto a take-up reel 19.

Figure 2:
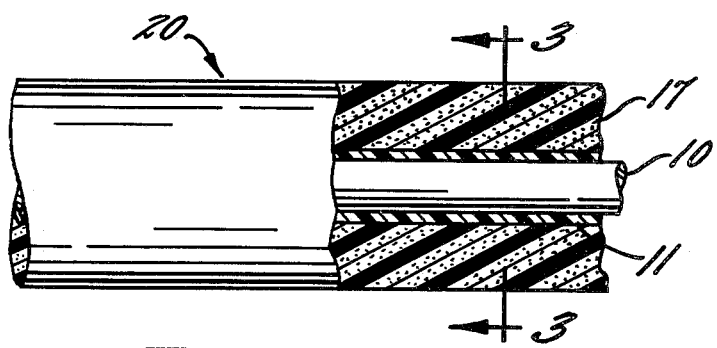
FIG. 2 is a side elevation, partially in section, of a jacketed electrical conductor wherein the jacket comprises a foamed composition embodying the present invention.
Figure 3:
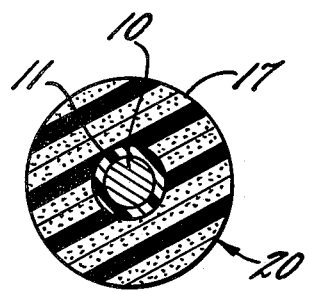
FIG. 3 is a sectional view taken substantially along the line 3—3 in FIG. 2.

When the jacketed conductor 20 shown in FIGS. 2 and 3 is to form a portion of coaxial dielectric cable 21 of the type shown in FIGS. 4 and 5, an outer conductor 22 is subsequently formed around the foam dielectric 17, typically by rolling a flat strip of metal around the foam, welding the longitudinal edges of the strip to form a closed tube, and then corrugating the tube into the foam dielectric to complete the formation of a corrugated outer conductor.

Figure 4:
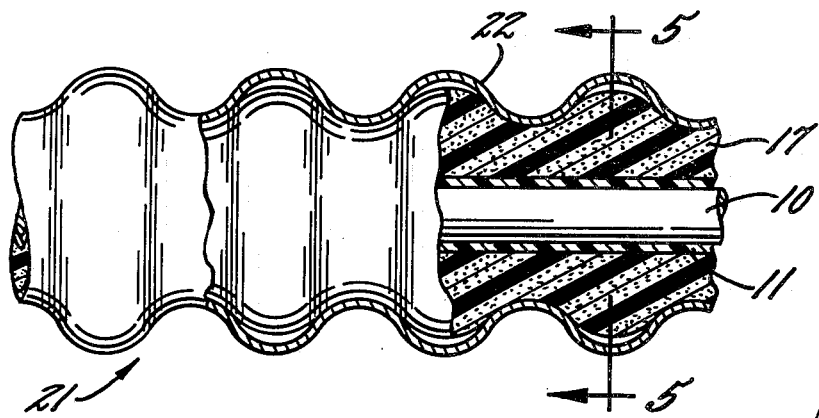
FIG. 4 is a side elevation, partially in section, of a coaxial cable having a foamed dielectric resin formed in accordance with the present invention; and, FIG. 5 is a sectional view taken substantially along the line 5—5 in FIG. 4.
Figure 5:
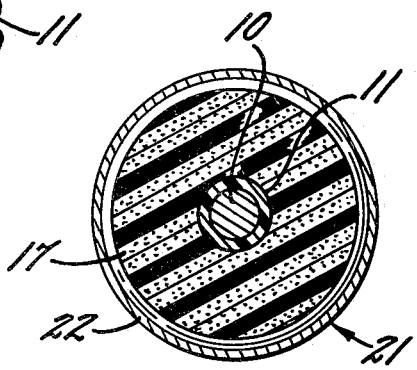

An example of a final coaxial cable is illustrated in FIGS. 4 and 5, with the preferred annular corrugations in the outer conductor 22. The low density foam dielectric 17 preferably has a small average cell size—e.g., on the order of from about 10 mils. to about 40 mils.—with a high degree of uniformity in the radial profile of cell size distribution. As mentioned previously, the foam dielectric in the cable provided by this invention exhibits a density of at least as low as 1.0 g./cc. and an insulation loss of less than about 1.8 db/100 ft. at 1000 MHz.

In accordance with one of the important aspects of the present invention, provision is made for controlling the size of the cells formed in the melt extrudable perfluorocarbon resin without the addition of materials which tend to degrade the melt strength of the resin, thereby permitting blowing of the resin to relatively low densities—e.g., densities at least as low as 1.0 g./cc.—while simultaneously obtaining a uniform cell structure in which the individual cells formed are, on average, only 10 to 40 mils. in size. In keeping with this aspect of the invention, I prefer to use a nucleating agent for this purpose which is compatible with the resin being used; and, I have found that particularly excellent results are achieved where the nucleating agent comprises PTFE, either in the pure state such, e.g., as in the form of "Hostaflon TF 1620", a product commercially available from American Hoechst Corp. located in Leominster, Mass.; or with suitable additives such, e.g., as "DLX 6000", a product commercially available from E. I. duPont De Nemours and Company, Wilmington, Del. The PTFE nucleating agent is capable of providing the desired foam density and cell size without significantly degrading the strength of the perfluorocarbon resin; thus, the quantity of nucleating agent added is really a function of the foamed resin's desired density and the cell size desired. However, I have found that excellent results are achieved where the PTFE nucleating agent has an average particle size of less than 200 microns and is added to the resin in an amount on the order of 0.5 to 2 parts PTFE to 100 parts of resin.

When the compositions and products of the present invention are used to form, for example, an insulated or jacketed electrical conductor or a coaxial cable, the particular material from which the conductors are formed is not critical to the invention and virtually any suitable electrically conductive material can be employed. However, in a high frequency coaxial cables the inner conductor is usually formed of copper or aluminum and the same metals are also generally used for the outer conductor. The inner conductor is normally either a solid wire or rod of aluminum or copper-clad aluminum, or a hollow copper tube with either a smooth wall or a corrugated wall. The outer conductor may also be either smooth walled or corrugated, although it is generally preferred to use a corrugated outer conductor to improve the strength and flexibility of the coaxial cable for any given metal thickness in the outer conductor. This is particularly true in the case of coaxial cables formed in accordance with the present invention where the low density foam dielectric has less strength than a higher density foam, so the higher strength offered by the corrugated outer conductor is preferred in order to provide the overall cable with the requisite strength. It is preferred that the corrugations be of annular configuration, as opposed to helical, so as to block the flow of moisture through the conductor-dielectric interface without the necessity of adding a sealant.

When employing an adhesive to bond the foamed melt extrudable resin to the conductor—for example, an adhesive such as shown at 11 in FIGS. 2–5—it is desired that the adhesive coating on the inner conductor adhere to both the metal of the inner conductor and the dielectric material. Even more importantly, the adhesive must provide sufficient bonding of the inner conductor to the dielectric while the dielectric is at its melt temperature, to prevent the foaming dielectric from sagging or blowing away from the inner conductor after it exits from the extrusion die. The preferred adhesive is a thin coating of solid perfluorocarbon resin, such as "Teflon 100" available from du Pont. Because the adhesive contributes to the insulation loss of the cable, it is preferred that when an adhesive is to be used, it be used in the form of a coating that is as thin as possible. In general, an adhesive coating with a thickness in the range of about 0.002 inches to about 0.004 inches is adequate to provide the requisite bonding in the cables of this invention.

The volatile fluid or blowing agent that is introduced into the extruder to foam the melt extrudable resin must be capable of foaming the resin with a closed cell structure so that moisture cannot be transmitted through the foam. It is preferred that the average cell size in the final foamed dielectric be relatively small, preferably in the range of from about 10 to about 40 mils., to provide optimum electrical and mechanical characteristics. As mentioned previously, the gas that forms the cellular structure in the dielectric must remain within the foam cells at least until the foamed resin has solidified sufficiently to be self-supporting—i.e., the gas must not permeate excessively through the cell walls or membranes until the foamed resin has been set. The volatile fluid must also be capable of being dissolved in or thoroughly dispersed throughout the melt extrudable resin so as to produce the desired uniform radial profile of cell size distribution. Preferred blowing agents include the lower fluorocarbons having only one or two carbon atoms such, for example, as fluoroethanes represented by the formula:

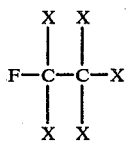

where X is selected from the group consisting of fluorine, chlorine, bromine and hydrogen. The preferred fluoroethane blowing agent is 1,2-dichloro-1,1,2,2-tetrafluoroethane available from duPont under the name "Freon 114".

While I have found that particularly advantageous results are achieved when the blowing agent comprises a fluoroethane as described above, the advantages of the present invention can also be achieved, at least to a degree, when the blowing agent comprises a fluoromethane represented by the formula:

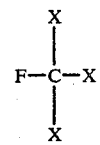

where X is selected from the group consisting of fluorine, chlorine, bromine and hydrogen—i.e., fluoromethanes such as those suggested in the aforesaid Randa U.S. Pat. No. 3,072,583 such, for example, as dichlorodifluoromethane and chlorodifluoromethane available from duPont under the names "Freon 12" and "Freon 22" respectively.

Moreover, while I have herein described a composition and process wherein the blowing agent is injected directly into the molten extrudable resin, those skilled in the art will appreciate that the blowing agent can be dissolved in the melt extrudable resin while the latter is in solid form, either before or after the PTFE nucleating agent is mixed therewith.

The following working example is given as an illustration of the invention and is not intended to limit the scope of the invention:

EXAMPLE

An inner conductor of copper clad aluminum wire having an outside diameter of 0.185 inches and heated to a temperature of 520° F. was coated by extrusion with a film of "Teflon 100" having a thickness of 0.003 inches. This coated inner conductor was then passed axially through the center of the crosshead of a twin screw extruder at a rate of 13 ft. per minute. The extruder was supplied with 0.8 lbs. per minute of a mixture of "Teflon 100" and PTFE at a ratio of 0.5 PTFE per 100 parts of "Teflon 100". Within the extruder, the mixture of melt extrudable resin and PTFE was heated to a maximum temperature of about 570° F., and then cooled to a melt temperature of 520° F. at the die face. While the melt extrudable resin and PTFE mixture was in the extruder, "Freon 114" was directly injected into the molten FEP-PTFE mixture at a pressure of 700–800 p.s.i. at a point where the molten mixture was at a temperature of about 560° F. The extruder formed a continuous layer of the FEP-PTFE-Freon mixture around the inner conductor, and this layer began to expand as soon as it left the extruder to form a layer of foam dielectric. This foam was air cooled. The resulting cable core had a smooth uniform layer of foam dielectric having a density of 0.78 g./cc., a thickness of 0.165 inches, a uniform cellular structure of non-interconnected cells 15 to 25 mils. in diameter, a void content of about 65% and a dielectric constant of 1.38. The coating was smooth surfaced and securely bonded to the inner conductor. An outer conductor of 0.010 inch copper was then formed around the core and corrugated to a depth of 0.040 to 0.048 inches in an annular pattern having a center-to-center corrugation spacing of 0.200 inch. The resulting cable was tested for electrical performance with the following results:

| | |
|---|---|
| Velocity | 85% |
| Attenuation at 1000 MHz | 3.45 db/100 ft. |
| Impedance | 50 ohms. |
| Insulation loss at 1000 MHz | 1.33 db/100 ft. |
| Average power rating at 1000 MHz | 1.29 KW. |

-continued (at 300° F. inner conductor temperature)

As can be seen from the foregoing detailed description, the present invention provides improved compositions and processes for forming foamed perfluorocarbon articles and, in particular, improved compositions and processes for forming improved jacketed electrical conductors and/or improved perfluorocarbon foam dielectric coaxial cables. When used to form perfluorocarbon foam dielectric coaxial cables, the invention provides thermal stability and fire resistance combined with significantly improved electrical performance—particularly, reduced insulation losses and attenuation—as compared with previous perfluorocarbon dielectric cables. Because the PTFE nucleating agent is compatible with the melt extrudable resins utilized, it does not, to any significant extent, degrade the melt strength of the resin and permits such resins to be blown to lower densities and with a uniform cellular structure having non-interconnected cells 10 to 40 mils. in diameter. The foam thus formed has the requisite cell size, uniformity and structure to provide the necessary structural strength and moisture blocking characteristics for both jacketed electrical conductors and coaxial dielectric cables. The improved coaxial cables also tend to have improved power ratings. Furthermore, jacketed electrical conductors and improved coaxial dielectric cables can be efficiently and economically manufactured on a commercial scale.

I claim as my invention:

1. A process for preparing the core for a foam dielectric coaxial cable, said process comprising the steps of:
   (a) forming a mixture of a melt extrudable fluorinated ethylene-propylene polymer and a polytetrafluoroethylene nucleating agent;
   (b) heating the polymer and nucleating agent mixture to the molten state;
   (c) extruding the molten mixture through an extrusion die while feeding a continuous conductor axially through the extrusion die so as to form a layer of foam dielectric surrounding and in intimate contact with the continuous conductor along the entire length and about the entire periphery thereof;
   (d) dissolving or injecting a volatile liquid blowing agent in the melt extrudable polymer at a point in the process prior to exit of the moisture from the extrusion die; and,
   (e) recovering the foamed articles exiting from the extrusion die.

2. The process of claim 1 wherein the fluorinated ethylene-propylene polymer is a copolymer of tetrafluoroethylene and hexafluoropropylene.

3. The process of claim 1 wherein the volatile liquid blowing agent is a fluorocarbon.

4. The process of claim 1 wherein the fluorocarbon blowing agent is a lower fluorocarbon having from 1 to 2 carbon atoms.

5. The process of claim 4 wherein the lower fluorocarbon is a fluoroethane represented by the formula:

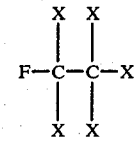

6. The process of claim 1 wherein the fluorocarbon blowing agent is 1,2-dichloro-1,1,2,2-tetrafluoroethane.

7. The process of claim 1 wherein on the order of 0.5 parts by weight of polytetrafluoroethylene are contained within on the order of 100 parts by weight of the fluorinated ethylene-propylene polymer.

8. The process of claim 1 wherein the average particle size of the polytetrafluoroethylene is less than 200 microns.

* * * * *